United States Patent [19]

Dunbar

[11] Patent Number: 4,897,920
[45] Date of Patent: Feb. 6, 1990

[54] SHEATH CUTTING TOOL

[76] Inventor: Donald W. Dunbar, 2945 Thomas St., Nanaimo, B.C., Canada, V9T 2Y5

[21] Appl. No.: 204,159

[22] Filed: Jun. 7, 1988

[30] Foreign Application Priority Data

Jun. 19, 1987 [CA] Canada ................................ 540152

[51] Int. Cl.$^4$ ............................................ B26B 27/00
[52] U.S. Cl. ........................................ 30/90.4; 30/162; 30/335
[58] Field of Search ...................... 30/2, 90.4, 162, 335

[56] References Cited

U.S. PATENT DOCUMENTS 4,139,939  2/1979  Crooks .............................. 30/162 X Primary Examiner—Douglas D. Watts
Attorney, Agent, or Firm—Nilsson, Robbins, Dalgarn, Berliner, Carson & Wurst

[57] ABSTRACT

This invention relates to a novel cutting tool. More particularly, this invention relates to a novel cutting tool which is specifically adapted to cutting the sheath of conducting cable without cutting or damaging the underlying conducting elements of the cable. A cutting tool useful for cutting sheathing on a cable comprising: (a) a holder for holding a cutting blade in a retracted or in an extended position; (b) a mechanism for pushing manually the blade from a retracted to an extended position and alternatively from an extended position to a retracted position; (c) a spring for urging the cutting blade into a retracted position when the cutting blade is in an extended position; and (d) a blade travel stop for controlling the distance that the cutting blade extends from the holder when in an extended position.

12 Claims, 3 Drawing Sheets

SHEATH CUTTING TOOL

FIELD OF THE INVENTION

This invention relates to a novel cutting tool. More particularly, this invention relates to a novel cutting tool which is specifically adapted to cutting the protective sheath of conducting cable without cutting or damaging the underlying conducting elements of the cable.

BACKGROUND OF THE INVENTION

In the telecommunications industry, and particularly the telephone industry, it is constantly necessary in order to enable hook-ups to be made, to access the conductors of protectively sheathed conductor cables, most commonly, polyethylene sheathed conductor cables. To accomplish this task, a tough protective polyethylene sheath and an underlying aluminum sheath must be cut and removed from a specific length of the cable without damaging the conductor elements which lie directly underneath the protective layers. This is a delicate task because, typically, the conductor elements are separated from the polyethylene and aluminum sheathing by only a relatively thin layer of paper or mylar, which provides negligible protection. As a result, there is a strong need for a cutter that is capable of cutting the polyethylene and aluminum sheathing both longitudinally and circumferentially to a precise depth without damaging the underlying conductor elements.

Because of the curved nature of the sheathing being cut, there is a tendency for any cutting blade to veer off the intended line of the cut, unless the cutting blade is supported laterally (across the line of cut).

Because considerable force is required to draw a blade through the tough protective sheathing layers, any occasion when the blade slips out of the sheathing being cut is necessarily followed by a somewhat violent "follow-through". This action endangers anything that lies in the path of the tool, including the operator's "non-cutting" hand. The tool of this invention overcomes this hazard by way of a blade which retracts immediately and forcefully upon disengagement with the material being cut by the tool. Cutting sheathing from conductor cable traditionally has been performed by the use of a fixed blade. But the lack of precision and the safety hazard presented by the use of a fixed blade has made such use prohibitive. Frequent injuries have resulted when the blade inadvertently slips out of the sheath during the cutting process. Cuts to the operator's non-knife holding hand which is usually used to hold the cable in place during the longitudinal cut, is a common occurence.

Precision in depth of cut has also been a problem due to the lack of any means for precisely determining the depth of cut when a fixed blade is used. The result is that conductor damage often occurs.

There is nothing in the prior art, to the inventors knowledge, that encompasses both a tool which is capable of precisely determining the depth of cut and has a safe, retracting blade in a form which is compact and streamlined and which is useful in confined quarters, where conductor cable sheathing is often being cut.

The inventor is aware of the following patents which disclose various forms of cutting tools:

| U.S. Pat. No. | Inventor | Issue Date |
| --- | --- | --- |
| 1,739,972 | Klinger | December, 1929 |
| 2,187,215 | Spinello | January, 1940 |
| 2,616,172 | Parker | November, 1952 |
| 3,906,561 | Bawa | September, 1975 |
| 3,906,627 | Manning | September, 1975 |
| 4,139,939 | Crooks | February, 1979 |
| 4,433,484 | Antisdel et al. | February, 1984 |
| 4,507,867 | Haas, Jr. | April, 1985 |

Bawa does not disclose any means of precisely determining the depth of cut. Also, since his tool is attached to pliers as specified, it is too cumbersome for cutting sheathing from conductor cable. The blade in Bawa's device can easily be held in an extended position while cutting Bawa does not disclose any means of lateral support to maintain the line of cut.

Manning also does not disclose any lateral support means to maintain line of cut. In Manning's design the angle of blade cutting edge to the hand angle of the tool is inappropriate for the job of cutting sheathing on a conductor cable. Manning's blade can be held extended manually while cutting.

Haas, Jr. discloses a large cumbersome cable sheath cutter knife which is always exposed. His cutter knife design has no lateral support to maintain the line of cut and no depth control facility. Consequently the blade can easily cut or damage the underlying conducting elements of the transmission cable.

Antisdel discloses a desiqn of cutting knife. Antisdel has a projection which must pass between the conductors and the sheath thus increasing the force necessary to accomplish the task at hand. The thickness of the head must pass through the cut directly after the blade, which inhibits cutting action.

Crooks discloses a cutting knife desiqn but the angle of the cutting blade edge to the hand angle is awkward and inefficient. His design has no depth of cut regulation capability. He also does not provide any lateral support to maintain line of cut on a cylindrical object such as a conductor cable.

Parker discloses a slitter for cable coverings. The slitter has a depth control facility but the blade is not retractable. The cutter is large and cumbersome.

Spinello discloses an electrical insulation cutter which has a non-retractable blade that pivots about a pin which is positioned midway along the handle of the cutter. His cutter is inappropriate for cutting the sheath of large diameter conductor cables.

Lastly, Klinger discloses a cable splitter which has an exterior blade. The blade is not retractable. Moreover, there is no depth control facility in the Klinger cable splitter design.

SUMMARY OF THE INVENTION

A cutting tool useful for cutting sheathing on a cable comprising: (a) means for holding a cutting blade in a retracted or in an extended position; (b) means for pushing manually the blade from a retracted to an extended position and alternatively from an extended position to a retracted position; (c) yielding biasing means for urging the cutting blade into a retracted position when the cutting blade is in an extended position; and (d) means for controlling the distance that the cutting blade extends from the holding means when in an extended position.

In the cutting tool, the blade may be pushed from a retracted to an extended position or from an extended position to a retracted position by means of a control means which is located on the exterior of the holding means. In the cutting tool, the control means may be located on the top of the holding means. In the cutting tool, the yielding biasing means may be a coil spring located in the interior of the holding means.

The invention also includes a cutting tool wherein the holding means may have finger and thumb grips constructed on one side of the holding means and a palm grip located on the side of the holding means opposite the finger and thumb grips. The control means may be located on the same side of the tool as the palm grip. In the cutting tool, the distance that the blade extends from the holding means may be controlled by an abutment formed in the holding means. The abutment may be formed in the end of the holding means from which the blade protrudes when in an extended position.

A cutting tool wherein the cutting blade may have formed in the end of the cutting blade a point which protrudes from the end of the holding means when the cutting blade is in an extended position. In the cutting tool, the holding means may be opened in order to replace the cutting blade.

DRAWINGS

In drawings which illustrate a specific embodiment of the cutting tool, but which should not be construed in limiting the scope of the invention in any way:

DETAILED DESCRIPTION OF A SPECIFIC EMBODIMENT OF THE INVENTION

The tool of the invention embodies precision and safety through the use of a spring-loaded penetration regulating retracting blade, which, when forcefully extended by the user and inserted into the sheath of a conductor cable, will remain extended as sheathing is cut by drawing the tool along and around the cable sheath by hand. Should the blade inadvertently slip out of the sheath during the cutting operation, the blade virtually instantly retracts into the body of the tool thus protecting the user from injury.

The tool body rides flush with the cable sheath during the cutting procedure. Regulation of the depth of cut by the tool is predetermined by the distance that the blade extends from the body of tee tool into the sheath when at full extension. Variations in depth of cut may be accomplished by removing a single assembly screw, removing the base component of the tool, and replacing the blade with a blade that has a longer or shorter cutting edge. Once the blade is replaced, the base component is put back in position, and the screw reinstalled in the moulded threads in the top plate.

It is worth mentioning that once a proper blade cutting edge length is selected, the tool can be utilized in virtually all telecommunication environments because cable sheath thicknesses (approximately 3.0 mm) are fairly uniform throughout North America. Changing of blades would normally be required only in extraordinary operations.

The acute angle of the cutting edge of the blade toward the nose of the tool encourages the blade to be pulled into the material being cut, thus tending to hold the blade in the material during the cutting procedure. This maintains depth of cut by minimizing instances where the blade inadvertently slips partially out of the material. The tool is easily carried in a craftsman's tool pouch, is lightweight and streamlined and can be used in close quarters as is often required.

Figure 1:
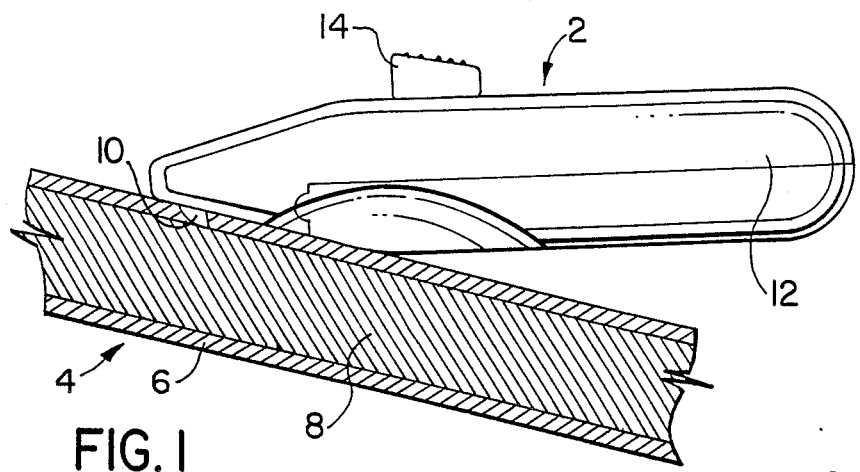
FIG. 1 illustrates a side elevation view of the cutting tool slitting the sheath of a sheathed cable conductor.

Referring now to the drawings and FIG. 1 initially, it can be seen that FIG. 1 illustrates a side elevation view of the cutter tool 2, cutting the sheath on a conductor cable 4. It can be seen that the conductor cable 4 is constructed of a multitude of conductor wires or strands 8, which carry telephone messages, or the like, all of which is protected by an outer sheath 6 of a given thickness. The cutter blade 10 extends a precise distance from the end of the cutter tool 2, such that when the toll rides on the surface of the sheath, tool 2 slits the sheath 6 only and does not damage the underlying conductor wires or strands 8. The cutter tool 2 is constructed of a handle 12, with a blade control knob 14 extending from the top of the handle 12. The cutter tool 2 is drawn along the cable 4 in a rightward and slightly downward direction, as seen in FIG. 1.

Figure 2:
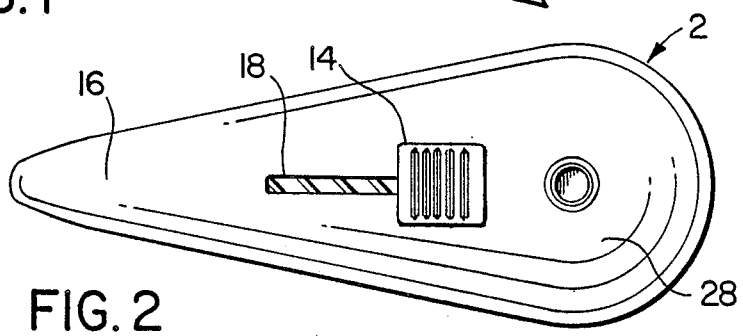
FIG. 2 illustrates a top view of the cutting tool.
Figure 3:
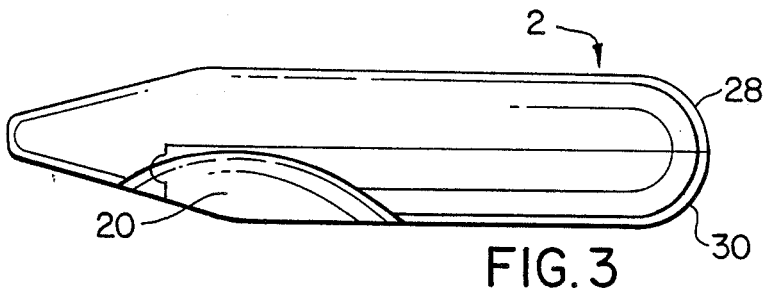
FIG. 3 illustrates a side view of the body of the cutting tool without the blade push knob.
Figure 4:
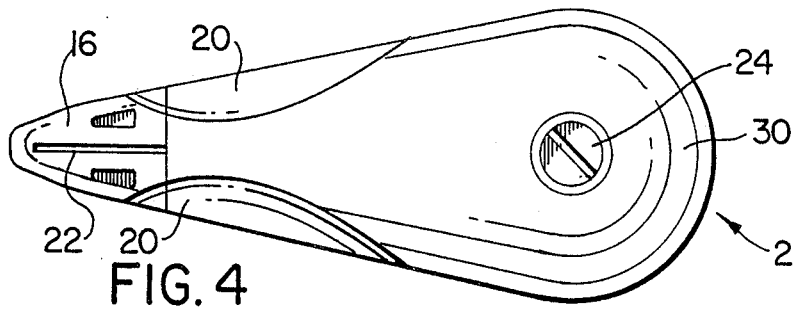
FIG. 4 illustrates a bottom view of the cutting tool.

FIGS. 2, 3 and 4 illustrate respectively a top view, a side view, and a bottom view of the cutter tool 2. Referring specifically to FIG. 2, it can be seen that the tool 2 is constructed with a nose 16, which is relatively narrow compared to the top of the handle portion 28. The handle 28 has a knob slide slot 18 formed in the top thereof. The blade control knob 14 can slide forwardly or rearwardly in knob slide slot 18. FIG. 3, which illustrates a side view of the cutter tool 2, demonstrates that the top portion of the handle is constructed of a top piece 28, and a bottom piece 30. Finger and thumb grips 20 are fashioned in the underside of the cutter tool 2. As seen in FIG. 4, which illustrates a bottom view of the cutter tool 2, a blade slot 22 is located in the nose 16 portion of the tool. Thumb and finger grips 20 are also visible. The bottom piece 30 is secured to the top piece 28 by means of a screw 24.

Figure 5:
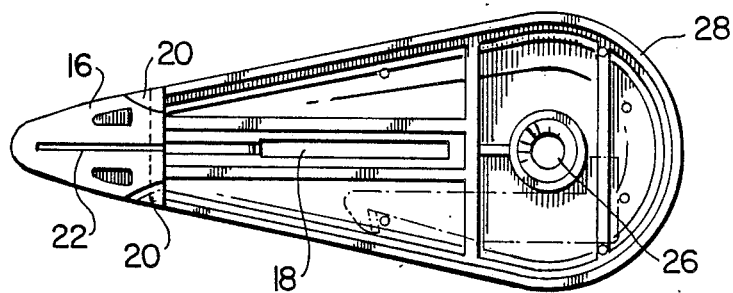
FIG. 5 illustrates a bottom view of the underside of the top plate of the cutting tool.
Figure 6:
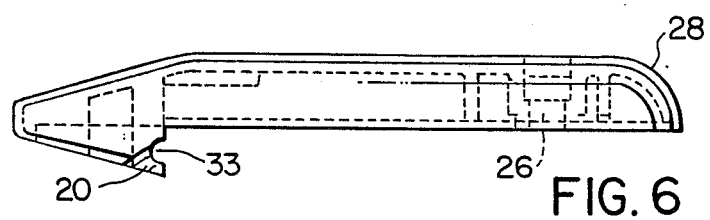
FIG. 6 illustrates a side view of the top plate of the cutting tool.

FIGS. 5 and 6 illustrate respectively a bottom view and a side view of the top piece 28. Blade slot 22 in nose portion 16 is shown in FIG. 5. Blade tab slide slot 18 is also illustrated. Screw hole 26, which is adapted to receive screw 24, is located in the wider portion of top piece 28. A portion of the finger and thumb grips 20 is also visible in FIGS. 5 and 6.

Figure 7:
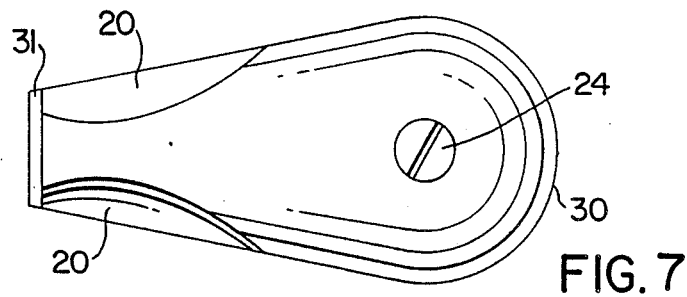
FIG. 7 illustrates a bottom view of the bottom plate of the cutting tool.
Figure 8:
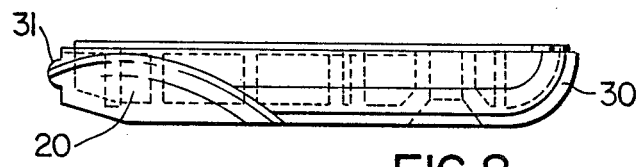
FIG. 8 illustrates a side view of the bottom plate of the cutting tool.
Figure 9:
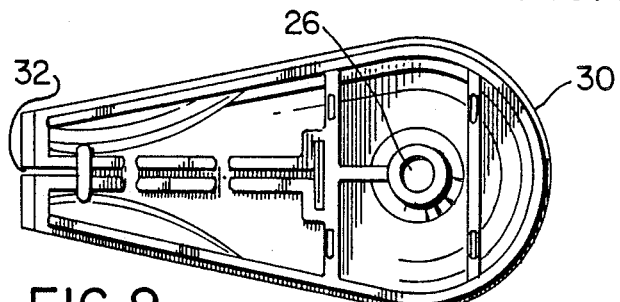
FIG. 9 illustrates a top view of the bottom plate of the cutting tool.

FIGS. 7, 8 and 9 illustrate bottom, side and top views of the bottom piece 30. FIG. 7 illustrates screw 24, and a portion of finger and thumb grips 20 The shape of finger and thumb grips 20 in bottom piece 30 are formed so as to meet smoothly with the corresponding portions of the thumb and finger grips 20, which are formed in top piece 28 A lip 31, is formed in the upper front portion of bottom piece 30, and fits within lip receptacle 33, which is shown in FIGS. 5 and 6. The lip 31, receptacle 33 combination ensures that the bottom piece 30 is maintained in proper relationship with top piece 20, when screw 24 is securely tightened Screw receiving hole 26 is illustrated in FIG. 9. FIG. 9 also illustrates an extension 32 of blade slot 22, which holds the blade 10, and enables it to be moved back and forth from a retracted to an extended position.

Figure 10:
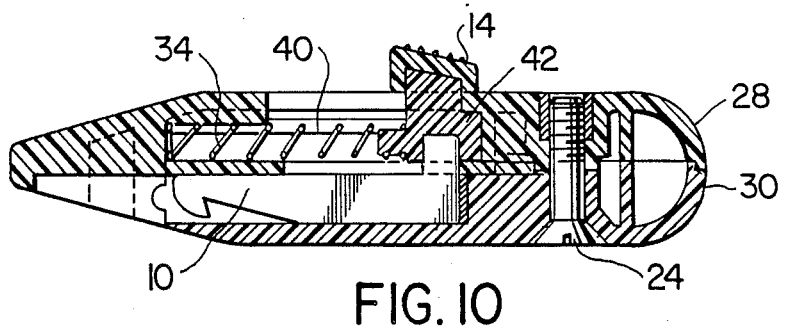
FIG. 10 illustrates a cut-away side view of the cutting tool with blade retracted.
Figure 11:
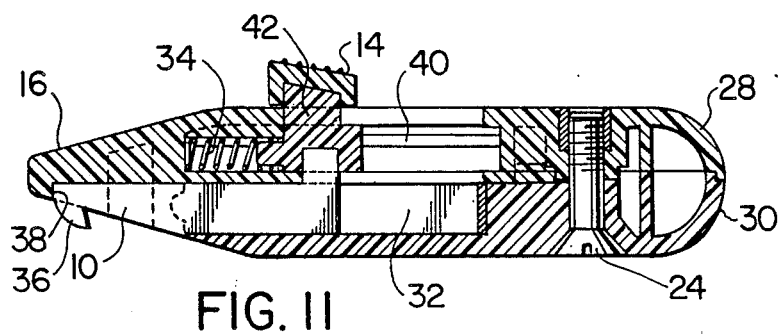
FIG. 11 illustrates a cut-away side view of the cutting tool blade extended.

FIGS. 10 and 11 illustrate in detail, by means of cutaway side view, the manner in which the blade 10 can be moved from a retracted to an extended position. In FIG. 10, blade 10 is shown in a retracted position as moved to that position by knob 14. A coil spring 34, shown in extended position, is positioned in spring-blade holder barrel 40. In FIG. 11, the coil spring 34 is illustrated in compressed condition, when knob 14 has been moved to a forward position, and thereby moves blade 10 so that it is in an extended position. Cutting point 36, in this extended position, protrudes from underneath the nose 16 a specified distance as determined by blade abutment 38. The extent to which cutting point 36 extends from the cutter tool can be adjusted by either machining away a portion of abutment 38, or filing or cutting away a portion of the end of cutting point 36. In North American industry sheath covered conductor cables tend to have sheaths of uniform dimensions so once the distance of protrusion of cutting point 36 is properly set, the same cutting tool can be utilized for slitting the sheath from all standard conductor cables of a given type and dimension. Cutting blade 10 slides backwardly and forwardly in blade slot extension 32, as shown in FIG. 11.

Figure 12:
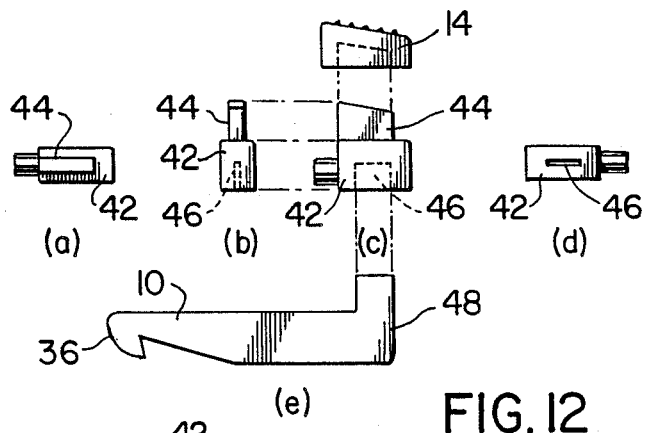
FIG. 12 illustrates a detailed side view of the blade mounting and extending mechanism.

In FIG. 12, elements a, b, c, d and e, illustrate the manner in which the blade control knob 14, is connected to the blade by means of blade holder 42, which receives the top portion of blade wing 48, of cutter blade 10 (see element e) of FIG. 12). The blade holder 42 is constructed generally of a cylindrical shape, and thereby fits within and slides backwardly and forwardly in spring-blade holder barrel 40, which is machined or cast on top piece 28. Blade holder 42 has protruding from the top portion thereof a wing 44, upon which knob 14 is secured. The underside of blade holder 42 has formed therein a blade wing slot 46, which receives blade wing 48 of cutter blade 10. The construction of blade holder 42 enables the cutter blade 10 to meet with knob 14, and thereby enables the user of the cutter tool 2, by pushing the knob 14 backwardly or forwardly, to move the cutter blade from an extended to a retracted position, and vice versa.

Figure 13:
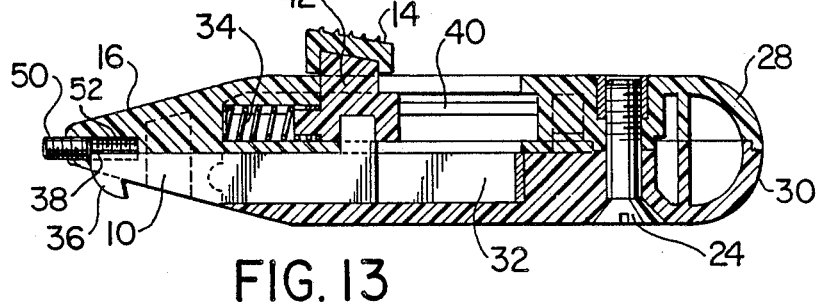
FIG. 13 illustrates a cut-away side view of a modification of the cutting tool including a set screw for regulating the distance the blade extends from the handle.

FIG. 13 illustrates a cut-away side view of a modification of the cutting tool 2. In this modification, a set screw 50 is set in a threaded hole 52 in the nose of the tool 2. As illustrated in FIG. 13, the set screw can be rotated clockwise or counterclockwise as required within the threads of hole 52 and thereby regulate the distance that the cutting point 36 protrudes from the end of the tool 2. This feature enables the operator to set the extension of the cutting point 36 according to the thickness of the insulating sheath that is to be cut by the tool 2.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A cutting tool useful for cutting sheathing on a cable comprising:
    (a) hand-grip holder having a general tapered shape for holding therein a cutting blade in a position retracted in the holder or in a position extending from the holder;
    (b) a cutting blade having on one side an effective cutting surface along its exposed length when the cutting blade is in an extended position, the cutting surface of the cutting blade being angled in the direction of cut when in an extended position;
    (c) blade moving means located on the exterior or the holder for enabling the cutting blade to be moved from a retracted position to an extended position from the narrow end of the holder and alternatively from an extended position to a retracted position;
    (d) compression spring means located within the holder for urging the cutting blade into a retracted position when the cutting blade is in an extended position; and
    (e) stop means located in the end of the holder for controlling the distance that the cutting blade extends from the holder when in an extended position.

2. A cutting tool as claimed in claim 1 wherein the control means is a movable button which is located on the top of the holder, opposite to the side from which the cutting blade can be extended or retracted.

3. A cutting tool as claimed in claim 2 wherein the compression spring means is a coil spring located in a hollow cylinder in the interior of the holder.

4. A cutting tool as claimed in claim 3 wherein the holder has finger and thumb grips constructed on one side of the narrow end of the holder and a palm grip located on the broad end of the holder opposite the finger and thumb grips.

5. A cutting tool as claimed in claim 4 wherein the blade moving means is located on the same side of the tool as the palm grip, and the area surrounding the point from which the blade is extended at the narrow end of the holder is flat.

6. A cutting tool as claimed in claim 5 wherein the distance that the cutting blade extends from the holder is controlled by a blade extended travel abutment formed in the narrow end of the holder.

7. A cutting tool as claimed in claim 6 wherein the abutment is formed in the narrow end of the holder from which the cutting blade protrudes when in an extended position, and when extended, the cutting blade protrudes from the flat end of the holder at an angle in the direction of the broad end of the holder.

8. A cutting tool as claimed in claim 7 wherein the cutting blade has a cutting edge which faces in the general direction of the broad end of the holder means when the cutting blade is in an extended position.

9. A cutting tool as claimed in claim 8 wherein the flat surface of the holder is at an angle to the longitudinal axis of the holder.

10. A cutting tool as claimed in claim 8 wherein the extension of the cutting blade from the flat surface of the cutting tool is regulated by an adjustable abutment means associated with the tool.

11. A cutting tool as defined in claim 10 wherein the abutment means is a combination of a set screw threadedly engaged in a threaded hole in the narrow end of the cutting tool, the extension of the cutting blade from the narrow end of the tool being regulated by the depth of the set screw in the threaded hole.

12. A cutting tool as claimed in claim 8 wherein the exterior surface of the holder means is roughened to enhance grippability of the holder.

* * * * *